United States Patent [19]

Wolf

[11] Patent Number: 4,790,285
[45] Date of Patent: Dec. 13, 1988

[54] FUEL SYSTEM

[76] Inventor: Gilbert Wolf, 7412 Laramie, Skokie, Ill. 60077

[21] Appl. No.: 863,507

[22] Filed: May 15, 1986

[51] Int. Cl.⁴ ............................................. F02M 31/12
[52] U.S. Cl. .................................... 123/549; 123/557; 219/205
[58] Field of Search ........................ 123/549, 552, 557; 219/205–207, 306–307

[56] References Cited

U.S. PATENT DOCUMENTS

| | | | |
|---|---|---|---|
| 2,669,299 | 2/1954 | Roach | 158/36 |
| 2,902,158 | 9/1959 | Muller | 210/184 |
| 4,044,742 | 8/1977 | Linder | 123/122 |
| 4,180,036 | 12/1979 | Wolf | 123/122 |
| 4,237,850 | 12/1980 | Connor et al. | 123/557 |
| 4,259,937 | 4/1981 | Elliott | 123/557 |
| 4,372,261 | 2/1983 | Sarto | 123/552 X |
| 4,372,279 | 2/1983 | Parks | 123/557 |
| 4,397,287 | 8/1983 | Pierard | 123/557 |
| 4,404,949 | 9/1983 | Bell | 123/557 |
| 4,473,054 | 9/1984 | Marcoux et al. | 123/557 |
| 4,477,715 | 10/1984 | Bell et al. | 123/549 X |
| 4,512,324 | 4/1985 | Neary | 123/557 |

FOREIGN PATENT DOCUMENTS

| | | | |
|---|---|---|---|
| 3505206 | 8/1986 | Fed. Rep. of Germany | 123/549 |
| 714036 | 2/1980 | U.S.S.R. | 219/205 |
| 973910 | 11/1982 | U.S.S.R. | 123/557 |

OTHER PUBLICATIONS

"Heater", Stanadyne Diesel Systems, No. 99205, Rev. 11/84.

Primary Examiner—Tony M. Argenbright
Attorney, Agent, or Firm—Leydig, Voit & Mayer

[57] ABSTRACT

The disclosure describes a fuel system including a fuel line, a fuel filter, and a fuel heater which is connected to the fuel line preferably upstream from the fuel filter. The fuel heater comprises a hollow casing having an inlet for admitting fuel into the casing and an outlet for discharging fuel from the casing. The fuel heater further comprises a heating unit operatively associated with the casing and including an electric heating element disposed within the casing, an electrical connector coupled to the heating element and extending through the casing, and a mechanism mounted to the casing for sensing fuel temperature within the casing.

1 Claim, 1 Drawing Sheet

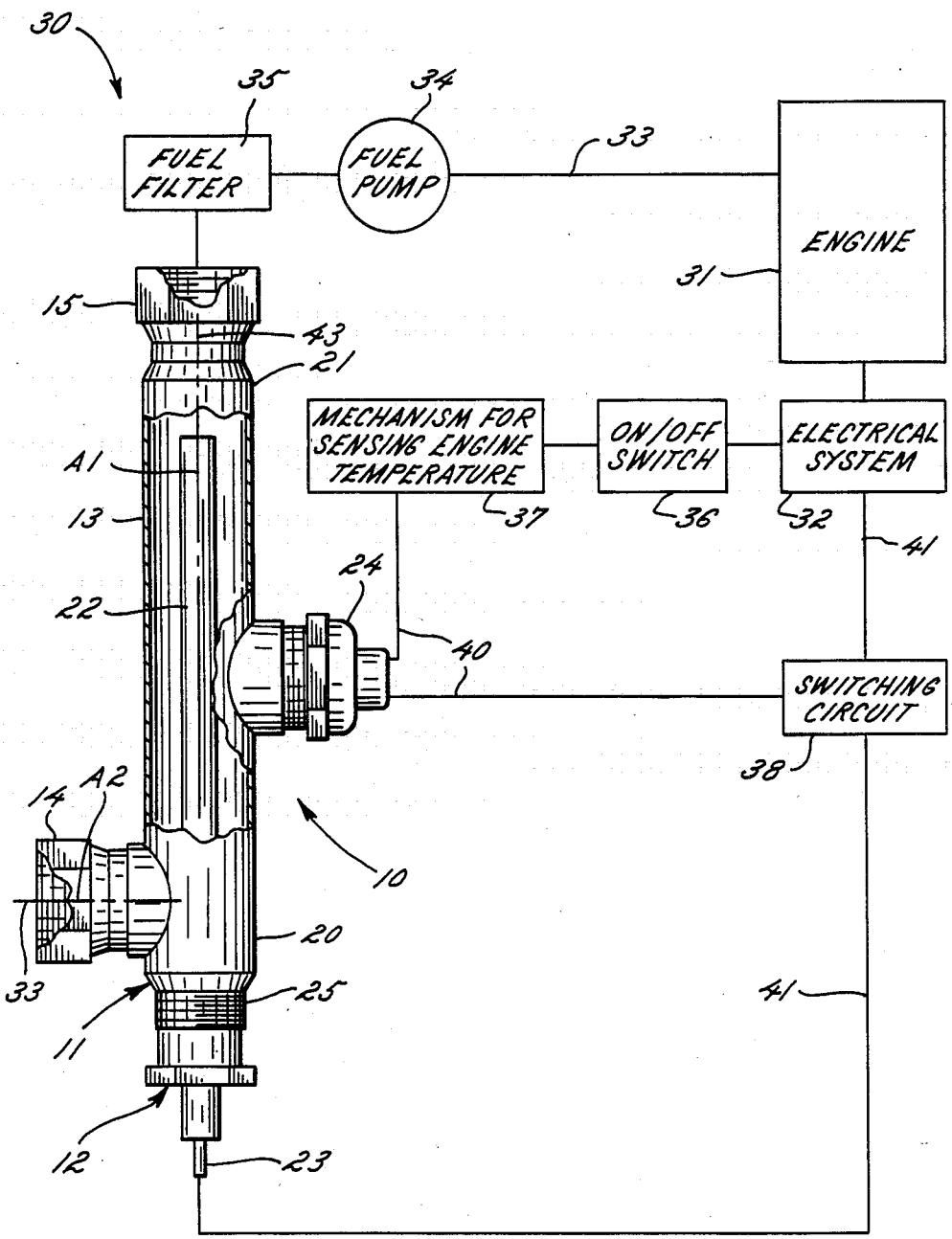

FUEL SYSTEM

TECHNICAL FIELD

The present invention relates to fuel systems and, in particular, to fuel heaters.

BACKGROUND OF THE INVENTION

Whenever the fuel tank or the fuel line of an engine is exposed to cold weather, the fuel or certain impurities or additives contained in the fuel may jell or "wax", i.e., they become excessively thick. For example, the diesel fuel in the fuel tanks or fuel lines of a diesel truck may wax if the truck is parked or driven in extremely cold weather.

Since waxing can interfere with the proper flow of fuel to the engine, it frequently results in poor engine performance. For example, most fuel systems include a fuel filter mounted in the fuel line for removing impurities from the fuel. As the cold fuel flows through the fuel filter, the fuel filter may become quickly clogged by the waxed fuel. The clogged filter may limit the amount of fuel which reaches the engine and consequently cause the engine to stall. Severe waxing may even block the flow of fuel entirely, killing the engine.

Waxing may be eliminated by heating the fuel. However, while many devices for heating fuel to eliminate waxing have been proposed, they nevertheless have several undesirable characteristics. For example, many devices known as heat exchangers utilize tubes through which is passed hot exhaust gas or a coolant that has been heated by the engine. The tubes are located within or adjacent the fuel tank or the fuel line so the heat of the gas or coolant may pass through the tubes into the fuel tank or the fuel line and thereby heat the fuel. Unfortunately, it frequently requires a considerable period of time for the coolant or exhaust gas to become hot and for the hot coolant or exhaust gas to sufficiently heat the fuel in the tank or the fuel line to eliminate any waxing. Further, heat exchangers are frequently large bulky devices which are difficult to conveniently mount in the fuel system.

SUMMARY OF THE INVENTION

The present invention provides a fuel system for an engine which also has an electrical system for providing electrical energy, the fuel system comprising a fuel line, a fuel filter, and a fuel heater. The fuel line supplies fuel to the engine and the fuel filter removes impurities from the fuel supplied to the engine. The fuel heater includes a hollow casing which is fabricated from stainless steel and has a first end and a second end. A casing includes an inlet which is connected to the fuel line for admitting fuel into the casing and an outlet which is connected directly to the fuel filter for discharging fuel from the casing. The inlet is positioned near the first end of the casing and has a threaded coupling which is attached to the fuel line and which has an axis perpendicular to the longitudinal axis of the casing. The outlet is positioned at the second end of the casing and has a threaded coupling which is attached to the fuel filter and which has an axis collinear with the longitudinal axis of the casing. The fuel heater also includes a heating unit operatively associated with the casing. The heating unit has an electrical heating element, a connector, and a fuel temperature sensor. The electrical heating element is removably disposed within the casing. The connector is coupled to the electrical system of the engine for supplying electrical energy to the heating element. The fuel temperature sensor senses the temperature of the fuel within the casing and interrupts the supply of electrical energy to the heating element in response to a predetermined fuel temperature. The fuel temperature sensor is mounted to the casing independently of the heating element so the heating element may be removed from the casing without removing the fuel temperature sensor. The fuel system further comprises an engine temperature sensor. The engine temperature sensor interrupts the supply of electrical energy to the heating element in response to a predetermined engine temperature.

The fuel system provided by the present invention offers several advantages. For example, because the heating element is disposed within the casing and heats the fuel by electrical energy, the fuel may be immediately heated without waiting for the engine to become hot. Also, because the heating element is mounted to the casing independently of the fuel temperature sensor, the heating element may be quickly and inexpensively replaced if necessary. Further, because the fuel heater is connected to the fuel filter, optimum filtration is insured since the fuel has no chance to cool and jell before being filtered.

BRIEF DESCRIPTION OF THE DRAWING

The FIGURE is a block diagram of a fuel system which incorporates a fuel heater embodying the present invention, the fuel heater being shown in a partial sectional elevation view.

DETAILED DESCRIPTION OF THE PREFERRED EMBODIMENT

As shown in the FIGURE, an exemplary fuel heater 10 embodying the invention generally comprises a casing 11 and a heating unit 12. The casing 11 may be fabricated from any suitable impervious material, including a rigid plastic or metallic material, but is preferably fabricated from stainless steel, which resists corrosion well. In the exemplary fuel heater 10, the casing 11 includes a hollow shell 13, an inlet coupling 14, and an outlet coupling 15.

Although the hollow shell 13 may be variously configured, it is preferably cylindrical, having a longitudinal axis A1 and first and second ends 20, 21. Further, although the inlet and outlet couplings 14, 15 may comprise any suitable fitting, each preferably comprises a swivel threaded female coupling. The inlet coupling 14, which is mounted to the shell 13 near the first end 20, has an axis A2 which extends perpendicularly to the longitudinal axis A1 of the shell 13. The outlet coupling 15, which is mounted to the shell 13 at the second end 21, has an axis A3 which extends colinearly with the longitudinal axis A1 of the shell 13.

The heating unit 12 of the exemplary fuel heater 10 includes an electric heating element 22, an electrical connector 23, and a fuel temperature sensing mechanism 24. The heating element 22 may comprise any suitable device for heating the fuel in the casing 11. However, the electric heating element 22 preferably comprises any of several commonly available immersible elements and extends within the casing 11, terminating near the second end 21 of the shell 13. The heating element 22 is preferably attached to a threaded connector 25 which is threaded to the first end 20 of the shell 13 to facilitate replacement of the heating element 22.

The electrical connector 23 extends through the threaded connector 25 to supply electrical energy to the heating element 22. The fuel temperature sensing mechanism 24, which may, for example, comprise a thermostatic element or any other suitable temperature responsive switch, is also threaded to the shell 13 between the first and second ends 20, 21 to monitor the temperature of the fuel in the casing 11.

As further shown in the FIGURE, an exemplary fuel system 30 incorporating the exemplary fuel heater 10 in accordance with the invention may be used with an internal combustion engine. For example, the exemplary fuel system 30 may be used with an ordinary diesel engine 31 having an electrical system 32. The electrical system 32 typically includes a device for generating electrical energy, a device for storing electrical energy, an ignition switch, and associated circuitry.

The exemplary fuel system 30 includes a fuel line 33 which supplies fuel from a fuel tank (not shown) to the engine 31 by means of a fuel pump 34. The exemplary fuel system 30 also includes a fuel filter 35 which removes impurities from the fuel, the fuel filter 35 being mounted in the fuel line 33 upstream from the engine 31. Although the exemplary fuel heater 10 is compact enough to be located anywhere in the fuel line 33, it is preferably located immediately upstream from the fuel filter 35. The outlet coupling 15 of the exemplary fuel heater 10 may be conveniently mounted directly to the inlet of the fuel filter 35, while the inlet coupling 14 of the exemplary fuel heater 10 is attached to the fuel line 33.

The exemplary fuel system 30 may further include an on/off switch 36, a mechanism 37 for sensing the temperature of the engine 31, and a switching circuit 38 for controlling the supply of electrical energy to the heating unit 12. The engine temperature sensing mechanism 31 may, for example, comprise a thermostatic element or any other suitable temperature responsive switch and may sense the temperature of the engine 31 directly or indirectly, for example, by sensing the temperature of the engine coolant. The switching circuit 38 may include any necessary solenoids and relays to interrupt the supply of electrical energy and may be physically separate from the exemplary fuel heater 10, as shown. Alternatively, if the currents supplied to the electric heating element 22 are sufficiently small, the switching circuit 38 may be fashioned from electronic components and incorporated in the heating unit 12 of the exemplary fuel heater 10.

In the preferred mode of operation during cold weather, the on/off switch 36 is turned on, providing a control signal to the switching circuit 38 along a control line 40 which allows electrical energy to be supplied via a supply line 41 through the switching circuit 38 and the electrical connector 23 to the heating element 22. Consequently, as fuel is withdrawn from the fuel tank by the fuel pump 34 and supplied via the fuel line 33 to the engine 31, the fuel first passes through the exemplary fuel heater 10 and then through the fuel filter 35. Since the fuel heater 10 is preferably disposed immediately upstream from the fuel filter 35 and since the electric heating element 22 is disposed within the casing 11, the fuel is quickly and efficiently heated immediately prior to entering the fuel filter 35. This ensures optimum filtration because the fuel has no opportunity to cool and jell before it is filtered.

If the fuel within the casing 11 becomes too warm, i.e., reaches or exceeds a predetermined temperature, the fuel temperature sensing mechanism 24 mounted to the casing 11 can signal the switching circuit 38 to interrupt the supply of electrical energy to the heating element 22. Further, if the diesel engine 31 includes a heat exchanger which warms the fuel once the engine coolant becomes warm, then the engine temperature sensing mechanism 37 may signal the switching circuit 38 to interrupt the supply of electrical energy to the heating element 22 once the engine 31 reaches a predetermined temperature. Of course, when the engine is operated in warm weather, the on/off switch 36 should be turned off, which also signals the switching circuit 38 to interrupt the supply of electrical enregy to the heating element 22.

Although the invention has been described in terms of a single exemplary embodiment, it is not limited to the embodiment. Alternative embodiments and modifications which would still be encompassed by the invention may be made by those skilled in the art, particularly in light of the foregoing teachings. Therefore, the following claims are intended to cover any alternative embodiments, modifications, or equivalents which may be included within the spirit and scope of the invention.

I claim:

1. For an engine which has an electrical system for providing electrical energy, a fuel system comprising a fuel line for supplying fuel to the engine, a fuel filter for removing impurities from the fuel, and a fuel heater including a hollow casing having a first end, a second end, and a longitudinal axis and being fabricated from stainless steel, wherein the casing has an inlet means connected to the fuel line for admitting fuel into the casing, the inlet means being disposed near the first end of the casing and including a threaded coupling attached to the fuel line and having an axis perpendicular to the longitudinal axis of the casing, and has an outlet means connected directly to the fuel filter for discharging fuel from the casing, the outlet means being disposed at the second end of the casing and including a threaded coupling attached to the fuel filter, the coupling having an axis colinear with the longitudinal axis of the casing, the fuel heater further including a heating unit operatively associated with the casing and having an electrical heating element removably disposed within the casing, connector means coupled to the electrical system for supplying electrical energy to the heating element, and means mounted to the casing for sensing fuel temperature within the casing and interrupting the supply of electrical energy to the heating element in response to a predetermined fuel temperature, the fuel temperature sensing means being mounted to the casing independently of the heating element whereby the heating element may be removed from the casing without removing the fuel temperature sensing means, and means for sensing engine temperature and interrupting the supply of electrical energy to the heating element in response to a predetermined engine temperature.

* * * * *